R. E. LIPPINCOTT.
AUTOMATIC EXHIBITION MECHANISM.
APPLICATION FILED MAY 13, 1907.

1,031,857.

Patented July 9, 1912.
5 SHEETS—SHEET 1.

Witnesses
Geo. M. Rice
Ella P. Blenus

Inventor
Robert E. Lippincott,
By Chas. H. Burleigh
Attorney.

UNITED STATES PATENT OFFICE.

ROBERT E. LIPPINCOTT, OF WORCESTER, MASSACHUSETTS, ASSIGNOR TO CHARLES H. BURLEIGH, OF WORCESTER, MASSACHUSETTS.

AUTOMATIC EXHIBITION MECHANISM.

1,031,857.  Specification of Letters Patent.  Patented July 9, 1912.

Application filed May 13, 1907. Serial No. 373,217.

*To all whom it may concern:*

Be it known that I, ROBERT E. LIPPINCOTT, a citizen of the United States, residing at Worcester, in the county of Worcester and State of Massachusetts, have invented a new and useful Automatic Exhibition Mechanism, of which the following is a specification, reference being made therein to the accompanying drawings.

A prime object of my present invention is to provide a practically efficient means for automatically showing works of art, pictures, advertisements or other exhibitive matter by a projecting-lantern, magic-lantern or stereopticon, and continually changing the displayed views or subjects in series, at predetermined intervals.

Another object is to provide a mechanically operated means for exhibiting common glass-plate lantern slides, transparencies or pictures, and for automatically shifting the plates into and from the path of the light in a projecting-lantern.

It is a further object of my invention to provide means for automatically displaying and shifting lantern slides or exhibit elements; said means so constructed and organized that it can be operatively combined with a plurality of projecting-lanterns for simultaneous exhibitions therewith.

A further and important object is to provide an automatic, power-operated means for carrying and shifting individual exhibit-elements in combination with a projecting-lantern, or plurality of such instruments, and a controlling means for automatically governing the time of exposure of the several exhibits.

Another object is to provide in conjunction with appliances for the automatic, intermittent and successive shifting of a series of exhibit-plates, in a projecting-lantern, of means for automatically stopping off the light during the interval of time while the shifting is being effected, and the removal of the shutter when shift-action has been performed.

The nature and features of my invention are more fully hereinafter explained; the subject matter claimed being definitely stated in the summary.

An embodiment of the invention is illustrated in the drawings, wherein—

Figs. 2 and 2ª are separate views showing a single and a plural form of lifter head.

In the carrying out of my invention I employ one or more projecting-lanterns or magic-lantern instruments, which may be of the well known form, and a suitable screen or screens therefor on which the pictures, announcements, or views are displayed. Combined with the projecting-lantern devices I provide an operative means for carrying an assemblage of individually supported exhibit elements, plates or slides, which are severally or independently shiftable by their individual supports, and also movable in respect to the entire series. I arrange therewith mechanism for bodily advancing or feeding forward the carrier of the assembled series with a step-by-step movement to bring the respective exhibit-elements or plates to a predetermined position coinciding with the exhibiting position or the plate-receiving space of the projecting-lantern. I also provide a controllable actuating means for automatically shifting the selected exhibit elements or plates, individually, from the series line and into alinement with the focal-axis of the projecting-lantern at its plate-receiving space, and to thus display a reproduction of its picture upon the screen; maintaining it there displayed for a determined period of time, and then effected or permit its retraction and return to the series line ready for the advancement of the series, and the repetition of the exhibitive display with the next exhibit-element of the assemblage, and so on in successive order, said mechanism being automatic in its performance. The mechanism is preferably operated by an electric or other suitable motor, and controlled by self-regulation in respect to the time limit for displaying the respective exhibits in their order.

Referring to the drawings, A denotes the stand or main frame, which can be of any approved form for supporting the working mechanism. Upon the stand I arrange a carrier C comprising, in the present instance, a horizontally disposed rotatable wheel member 2 surmounted by a fulcrum-supporting member 3 presenting a slotted elevated rim, or series of fulcrum bearings, and carrying a series of individual slide-placing flights or tiltably acting elements for severally holding and presenting the picture slides or exhibit-plates, and which in the instance illustrated are arranged as radially disposed movable arms, levers, or tiltable bars 5, suitably fulcrumed, at 4, within the slots 6 upon said carrier member.

The individually movable flights or arms 5 are each provided at their outer ends with a clamp device 7, or means for holding an exhibit-plate or element E, of the same or similar character to the transparencies or glass slides commonly used in stereopticons. Said exhibit-plates are detachably secured to the respective arms in vertical plane therewith, and can be removed and replaced on the arm for temporary use, or so that the series of exhibit-elements can be set up to include any required class of pictorial views, diagrams, or advertising matter, and the series conveniently changed when desired. Each of the plate-holding arms is provided with a spring 8 or equivalent means for normally retaining the arm with its outer end elevated. The series of plates thus held can revolve about the main axis without interfering with the projecting-lantern, while the flights or swinging elements serve to individually sustain the respective slides or exhibit-plates attached thereto, and to swing the same into exposed position, and back into retracted or idle position, by an edgewise tilting or oscillating action.

The carrier-wheel is mounted on a bearing hub or sleeve 9 seated upon the stand, and having a central opening through which extends an endwise movable plunger-rod 10. The members 2 and 3 of the carrier may, in some instances, be made a single piece; but I prefer to make the upper member separable from the lower member and superimpose it thereon in a manner that will permit of the fulcrum-bearing portion being readily removed and replaced, together with its entire series of plate-holding arms; and without releasing the arms at their fulcrum joints from their bearings, unless otherwise desired.

The fulcrum supporter 3 is seated upon the wheel 2 concentric with the axis; and suitable means, as lugs or dowels $d$, are provided so that the two parts will move rotatively in unison. The wheel is provided with ratchets, or pins 14, and a pawl device is combined therewith for rotatively advancing the carrier with a step-by-step movement corresponding with the spacings of the series of arms.

Figures 2, 2A:
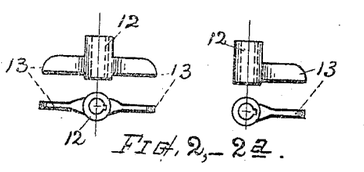

The upper portion or head 12 of the plunger-rod 10 is provided with a lateral projection 13 that extends beneath the inner ends of the arms 5 at a location corresponding with the plate-receiving space $e$ of the lantern. Said projection serves for engaging with and actuating a selected arm when the plunger is elevated. The plunger-head is best made removable from the plunger-rod and secured by a nut or detaching fastener to facilitate removal of the carrier from its support. In some instances the plunger-head may be made with a plurality of projections 13, as in Fig. 2, to accommodate a plurality of lanterns when used, (two or more according to the requirement,) or it may be made with a single projection 13, as at Fig. 2$^a$, when but a single lantern is employed.

Figure 6:
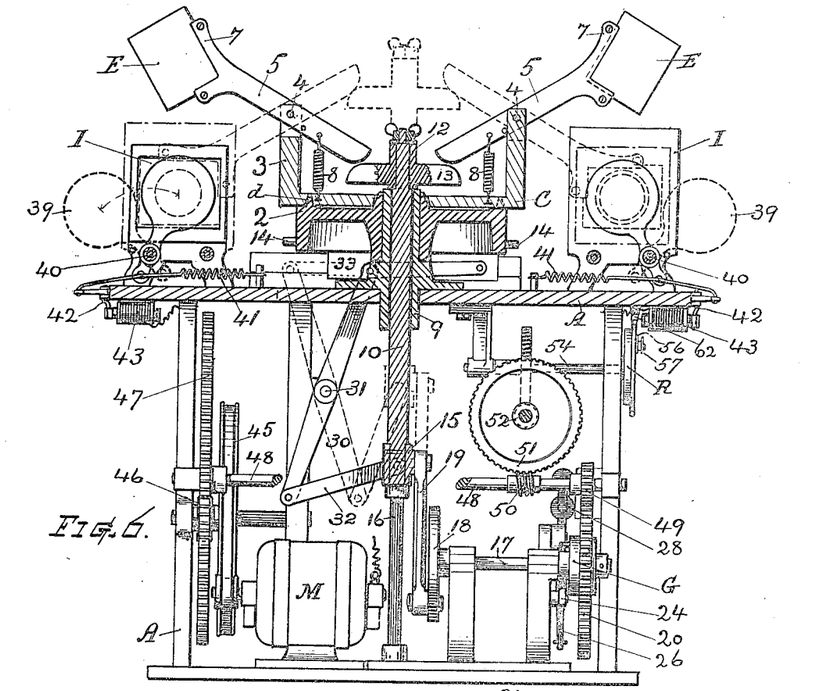
Fig. 6 represents an elevation view with some of the parts shown as in section.
Figure 7:
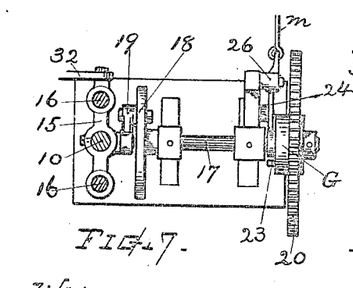
Fig. 7 is a horizontal section of the plunger guides and a plan view of the crank-shaft and reciprocating cross-head that carries the plunger.

The projecting-lantern I is arranged with its lamp-chamber and lens tube disposed approximately as shown, adjacent to or beneath the outer ends of the arms 5, its plate-receiving space $e$ located in such relation that the tilting or movement of an arm at the pre-determined position will carry the exhibit element or plate held thereby, from the normal line of the series to a position in alinement with the focal axis of the projecting-lantern lenses (see dotted lines Fig. 6) and in proper relation for displaying the picture of such exhibit element upon the screen D.

A single projecting-lantern I would in most instances be used; but it will be understood that either one, two, three or four projecting-lanterns can be arranged in the relation illustrated and employed in combination with a single carrier mechanism and its series of plate holding arms, and I desire to include each and all of such arrangements as within the scope of my invention. In the present drawing, Fig. 1 two projecting-lanterns I are shown, facing in opposite directions, their picture screens being disposed at proper distances therefrom at front and rear, substantially as indicated at D and D$^1$. Other projecting-lanterns, if desired, may be placed to face laterally or at the position I$^2$ and I$^4$, Fig. 1, and screens suitably provided therefor.

Figure 1:
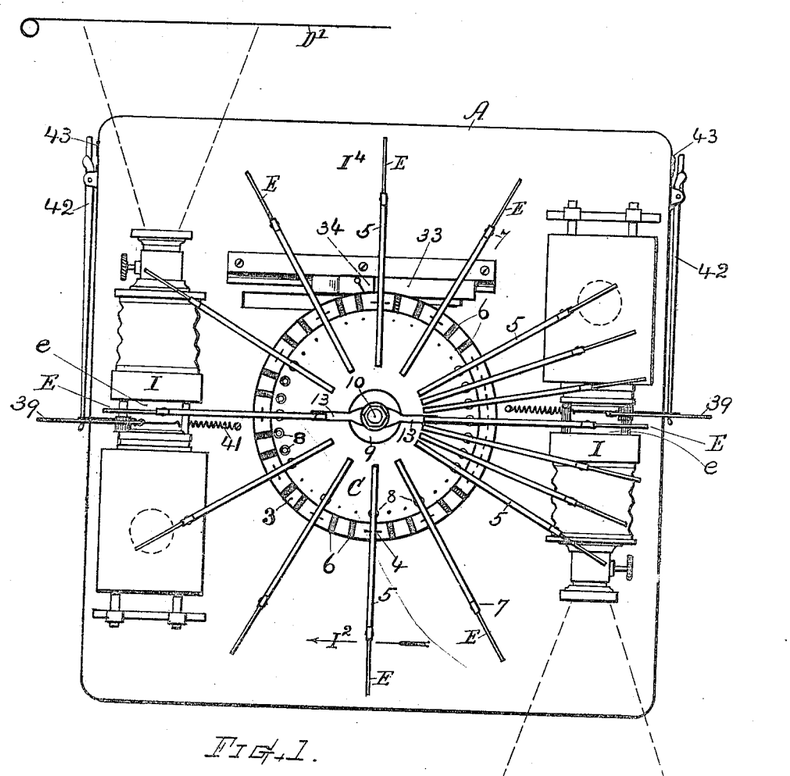
Figure 1 represents a plan view at the top of the mechanism.

The fulcrum carrier rim 3 may be provided with slots or seats for carrying any convenient number of flights or arms 5 thereon, as may in any instance be desired. In Fig. 1 it is shown as arranged for thirty six arms, but for simplicity of illustration a number of said arms are omitted in the drawings. Such arms are all of similar structure.

Figure 3:
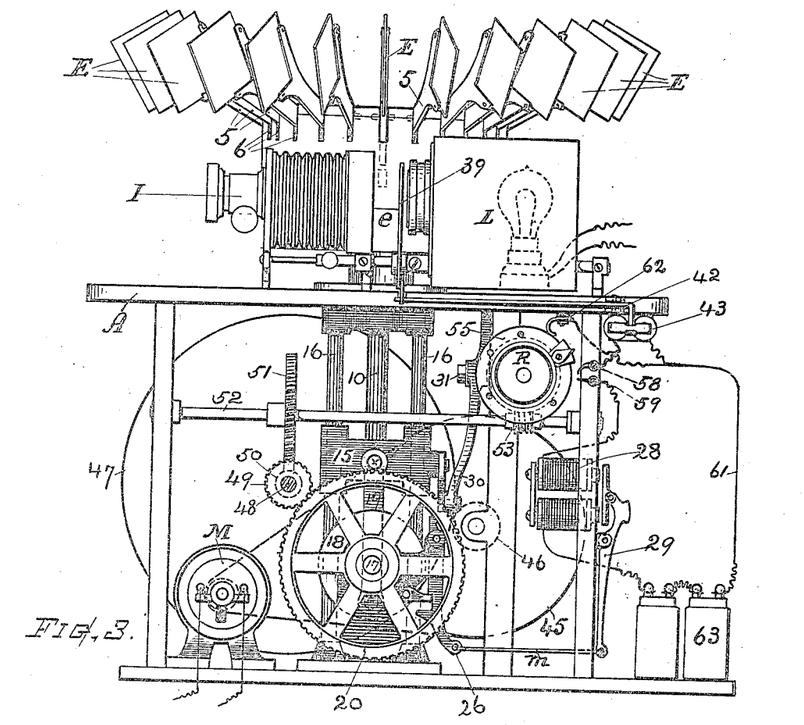
Fig. 3 is a side elevation view.
Figure 4:
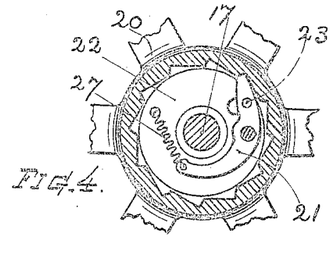
Fig. 4 is a section view of an automatic-stop clutch for crank-shaft mechanism.
Figure 5:
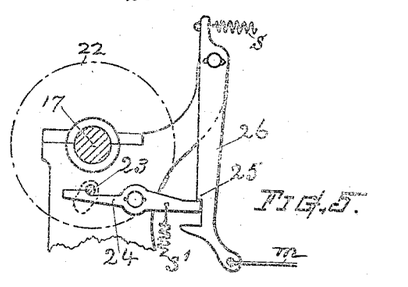
Fig. 5 is a detail of clutch-tripping devices therefor.

The plunger-rod 10 is non-rotatively secured in a cross-head 15 that runs on suitable guides 16, and is operated by a shaft 17 carrying a plate or crank 18 the wrist-pin of which is joined with the cross-head by a connection-bar 19 which imparts reciprocal movement to the cross-head and plunger-rod when the shaft is rotated. An operating wheel 20 is arranged to run loose upon the crank-shaft and to connect therewith by an automatic-stop clutch G adapted for giving one complete revolution of the shaft when the clutch is tripped. A clutch and trip-devices, such as shown in Figs. 4 and 5, may be employed in this connection; or any approved form of clutch can be used in lieu thereof for effecting equivalent action. The clutch as shown, comprises an internally toothed ratchet within the hub of the wheel 20; a pivoted pawl 21 carried on a plate 22 fixed to the shaft 17; said pawl having a pin 23 that projects through an opening in the plate and is engageable with a pivoted tilt-piece or lever 24, the rear end of which latches against a lug 25, or offset on the trip-lever 26. When the trip-lever is drawn back the tilt-piece releases the pin and the spring 27 causes the pawl 21 to engage one of the teeth of the ratchet, thus locking the clutch to effect operation of the shaft. The trip-lever and tilt-piece are then returned to primary positions by suitable springs $s$ and $s^1$, re-latching said tilt-piece against the lug, and as the pin 22 comes around it rides the end of the then rigidly held tilt-piece, forcing the pawl from the ratchet, thus releasing the clutch G as the shaft completes its revolution. The clutch-tripping device is actuated by electro-magnets 28, the armature of which is provided with a lever 29 that is suitably connected by a link $m$ with the trip-lever, as best shown in Fig. 3, or in other efficient manner.

Means for actuating the feed-pawl 34 of the carrier ratchet-wheel is preferably arranged to operate in conjunction with the plunger-rod. Said means, in the present instance, comprises a lever 30 fulcrumed on a portion of the frame at 31, and having its lower end connected by a pivotally attached link 32 with the cross-head 15, while its upper end is connected with a slide piece 33 that carries the pawl-device 34 which engages the pins 14 or ratchet-teeth of the wheel 2. (See Figs. 1 and 8.)

Figure 8:
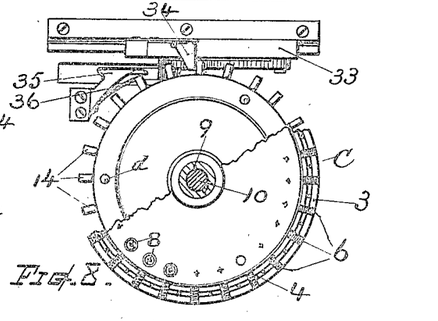
Fig. 8 is a detail plan view showing the ratchet or feed-wheel, its actuating devices, and a portion of the fulcrum-bearing supporter.
Figures 9, 10, 11:
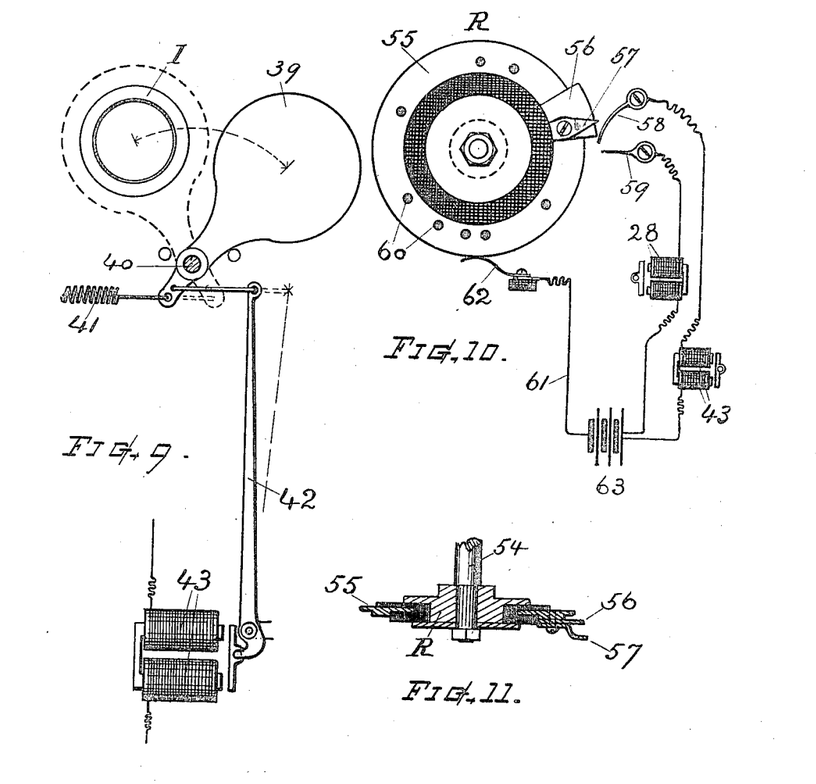
Fig. 9 is a separate detail view illustrating the shutter and its operating means.
Fig. 10 is a detail front view of the controller or timing-wheel appliances.
Fig. 11 is a cross section of the timing wheel.

The pawl proper is hinged to its supporting slide so as to yield and pass the detents or pins without effect when drawn back, and to engage and move the carrier one step as the slide and pawl move forward. A guard 35 is preferably provided to prevent premature engagement of the pawl and detents, and a suitable back-stop 36 may be employed for preventing any retrogressive action of the carrier.

The parts are preferably proportioned and arranged so that the feed movement takes place when the plunger-rod is approaching its point of greatest depression, or while the projection 13 is below the ends of the arms.

As a further improvement I provide a light-stopping shutter 39, arranged to move into and from the path of light through the projecting lantern, for shutting light of the lantern L from the plate or screen during the shifting of the exhibit elements. Said shutter, as illustrated, is mounted on a pivotal axis 40 and has a retracting spring 41 that normally retains it out of range. There is also provided suitable actuating devices, as for instance, a connected lever 42, controlled by electro-magnets 43 for throwing the shutter into action when an energizing current is passed through said electro-magnets.

M indicates an electric motor from which power and motion are transmitted, through suitably arranged gearing, to the wheel 20 of the crank-shaft 17, and to a timing wheel R hereinafter described.

As employed in the present instance the transmission gearing comprises a wheel 45 operated by belt from the motor-shaft; a shaft 48 having thereon a gear-wheel 47 operated by a pinion 46 on the shaft of the first wheel, and carrying a pinion 49 that meshes with the operating wheel 20; also carrying a worm 50 that engages a worm-gear fixed on a suitable shaft 52, which in turn carries a worm 53 that operates a worm-wheel fixed on the axle 54 of the timing wheel R, which latter rotates with a comparatively slow movement. The construction of the transmission gearing can in any instance be modified to attain such arrangement, location and speed for its several parts as may be desired; the essential features thereof being to effect the proper driving of the crank-shaft gear, and the operation of the timing-wheel.

The timing-wheel or controller R preferably comprises an insulated annular disk or rim 55 having secured thereon contact members 56 and 57 that respectively co-act with the stationary terminals or contact points 58 and 59, respectively connected with the shutter-controlling magnets 43 and clutch-tripping magnets. The contact member 57 for closing and breaking circuit with the clutch-tripping magnet 28 has a narrow point;

while the contact member 56 for closing circuit through the shutter-controlling magnets has an extended contact surface which is arranged for closing its circuit previous to that of the trip-magnet, and to maintain the same closed until after the clutch is operated, and the shifting of the exhibit elements has been accomplished; it then breaks the circuit.

The conductor 61, from a suitable electric-battery 63, may be applied to the controller or timing-wheel rim by a suitable contact member 62 that constantly bears against said rim as it revolves, or in other approved manner.

The controller disk may be provided with any convenient number of holes 60 for the attachment of the contact members, so that the latter can be adjusted at different positions thereon; or to accommodate a plurality of sets of contact-members.

In the preparative setting up of the display, a sufficient number of exhibit-plates or elements E, containing pictures, advertising announcements, or such other matter as is desired for exhibition in the assemblage of views in any particular instance, are arranged in the desired sequence, and the plates respectively secured to the individual supports or arms 5, as indicated. The mechanism being then put in motion, and the clutch tripped, a revolution of the crank-shaft 17 takes place. The plunger-rod 10, actuated by the crank and connection 19, descends and rises to the position indicated by dotted lines on Fig. 6. In its downward movement, and while the projection 13 is below the inner ends of the arms, the connections 30 and pawl devices 34 act to advance the carrier, bringing one of the flights or arms with its exhibit-plate into proper relation over the projection 13. Then as the plunger-rod moves upward the arm or plate-supporting member 5 is moved or tilted, carrying the exhibit-plate into alinement with the axis of the projecting-lantern, to be displayed upon the screen D as the shutter 39 is opened. The clutch then automatically throws off, stopping the crank-shaft, and the exhibit-holding member remains in its assumed position until the controller or timing-wheel R completes its revolution. When the contact member 56 reaches the terminal 58 a circuit through the magnets 43 is thereby closed and said magnets cause the closing of the shutter 39 which stops off the passage of light through the projecting-lantern. Immediately thereafter the contact member 57 striking the terminal 59 closes, for an instant, the circuit of the magnets 28; this effects the tripping of the clutch G and the restarting of the plunger mechanism; causing the first exhibit element E to be returned to series line and a succeeding exhibit-element to be brought down into alinement with the projecting-lantern axis. In like manner the operation automatically proceeds, shifting the successive exhibit-elements into and from display position, in their order, so long as the motor is kept in motion.

When a plurality of projecting-lantern instruments are combined with the plate-shifting mechanism, as illustrated and hereinbefore explained, the operation of the shutters and plate-holding arms as above described, is effected at each of such instruments, the series of exhibit-elements passing around in their order, and while one exhibit is displayed upon one screen D another of the exhibits is simultaneously displayed upon the other screen $D^1$, thus affording an automatically presented exhibition, observable from different directions, with its views or exhibits changing at regular or determined intervals.

In instances in which the carrier or fulcrum-bearing ring 3 is separable from the carrier base, an extra carrier and set of arms may be employed, if desired, so that a display series of exhibit-elements can be set up or assembled on one carrier while the other is in service on the machine. Then by loosening of the nut or fastener and removing the plunger-head 12, the first carrier and exhibits can be readily lifted off and the second carrier immediately placed thereon; thus avoiding any long delay in the running of the exhibition, for changing the series of exhibits.

Figure 12:
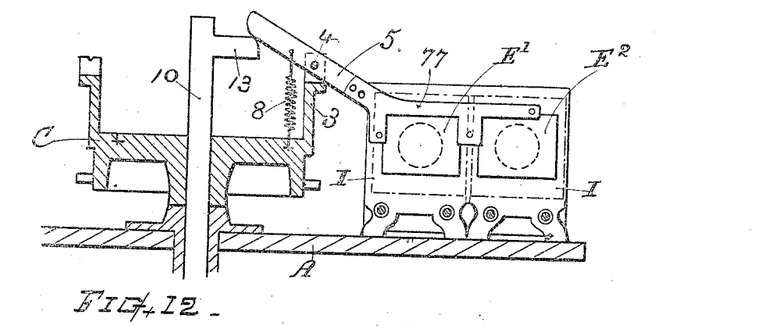
Fig. 12 is a sectional elevation diagram, and Fig. 13 a plan diagram illustrating the adaptation of my invention to dual or twin projecting-lanterns for display of views in extended or continued length.
Figure 13:
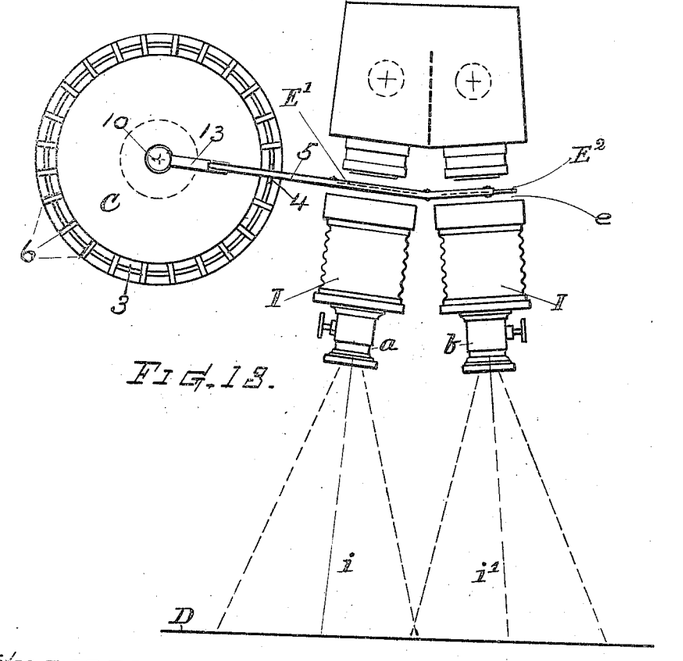

Figs. 12 and 13 illustrate a modification of the invention designed for displaying of views or advertisements of greater length than may be conveniently brought within the field of a single lens. In this modification I employ a dual or twin projecting-lantern or stereopticon, and construct the plate-holding arms 5 of sufficient length, and with clamping facilities 77, for holding a plurality of exhibit-plates, as $E^1$, $E^2$; said plates being relatively arranged as indicated, so as to respectively fall into alinement with the focal axes of the two lens tubes $a$ and $b$. The lens tubes are disposed with their axial lines sufficiently laterally divergent to cause their fields of illumination $i$ and $i^1$ upon the screen D, to occupy separate but adjacently overlapping positions, approximately as indicated by dotted lines on Fig. 13. The exhibit, view, or advertisement matter is prepared with a part of it upon the plate $E^1$ and a part upon the plate $E^2$, and the parts are suitably adjusted so that when displayed in the dual projecting-lantern the entire exhibit of the two plates will appear upon the screens as a unitary complete display extending across the two adjoined or adjacent fields of illumination. The general organization and operation of the mechanism, with this modification, is essentially the same as herein above described.

I am aware that in practice changes may be made by those skilled in the art, in the form and arrangement of the parts, without departing from the nature and scope of my invention as expressed in the claims. I do not desire, therefore, to be limited to the precise details of construction as shown.

What I claim and desire to secure by Letters Patent, is—

1. An automatic exhibition mechanism, comprising a projecting lantern, an assemblage of independent exhibit-plate-holding means arranged to carry assembled exhibit-plates and bring them successively to the projecting lantern, an operating mechanism therefor that intermittently engages and advances said assemblage of exhibit-plate-holding means, and an actuating mechanism that intermittently effects transfer of an individual plate-holder to bring a plate into line with the focal axis of the projecting lantern.

2. In a mechanism for the purpose specified, the combination of a projecting-lantern, a suitable carrier, a plurality of movable plate-supporting members mounted upon said carrier, and having means whereby individual exhibit-plates can be attached to said members, means for individually actuating the plate-supporting members at a pre-determined position for bringing the exhibit-plates into the projecting-lantern, and means for intermittently advancing the carrier and plate-holding members.

3. In a mechanism of the class described, the combination, of a revoluble carrier, means for intermittently moving said carrier, a plurality of movable plate-holding devices mounted upon said carrier and severally provided with means for the temporary securement thereto of exhibit-plates, means for moving the individual plate-holding devices in a plane approximately radial to the carrier to bring the exhibit-plates to and from a determined exhibiting position, and an illuminating apparatus for directing light through said exhibit-plates when at said exhibiting position.

4. In an automatic exhibition mechanism, in combination, a horizontally rotatable carrier, a series of radially disposed exhibit-holding elements movably mounted thereon, each adapted for carrying an exhibit-plate into and from a path of light, an actuator engageable with said exhibit-holding elements individually at a pre-determined position in the series, for display of an exhibit-plate, and means acting synchronously with said actuator for advancing the carrier with a step-by-step movement corresponding with the spacings of the exhibit-holding elements.

5. The combination, with a projecting-lantern of a rotary carrier, a series of arms tiltably mounted upon said carrier, means for detachably securing exhibit-plates to said arms, means for tilting a selected individual arm to bring its exhibit-plate into the projecting lantern, and mechanism that effects intermittent rotative advancement of the carrier.

6. In a mechanism of the class described, a separable carrier comprising a rotating wheel-member and a superimposed fulcrum-supporting member removably arranged thereon, a series of tiltable levers or arms fulcrumed on said supporting member and individually provided with means for holding exhibit plates, a plunger-rod arranged central of said carrier and having a plunger-head provided with a radial projection adapted for tilting said levers individually, said plunger-head being detachably secured to the plunger-rod and removable therefrom; in combination with a light-projecting means, means for operating said plunger-rod, and means for rotating the carrier-wheel.

7. An automatic exhibition mechanism, comprising a plurality of projecting-lanterns, an assemblage of plate-holding means arranged to carry individual exhibit-plates to the several projecting-lanterns in common, and an intermittently acting means that effects the introduction of the exhibit-plates individually into the several projecting-lanterns in their order.

8. In an automatic exhibition mechanism, in combination a plurality of projecting-lanterns faced in different or approximately opposite directions, a revoluble carrier mechanism with means comprising a series of movable arms for holding an assemblage of exhibit-plates thereon, said carrier disposed centrally between the projecting-lanterns, its plate-holding means reaching to and arranged for carrying around exhibit-plates and for individual introduction of the same into the several projecting-lanterns in their order, means for actuating the individual plate-holders, and means for applying power and motion to said plate-carrier mechanism.

9. In a mechanism of the class described, in combination, a plurality of differently positioned projecting-lanterns, an assemblage of individually movable elements for supporting and carrying exhibit plates to the projecting-lanterns, mechanism for automatically moving said elements individually for inserting and removing the respective exhibit-plates carried thereon into and from the projecting-lanterns, and means for advancing the assemblage of plate-carrying elements step-by-step to bring the different plate-supporting elements to the exhibiting position.

10. An apparatus for the purpose specified, comprising a suitable stand, a projecting-lantern arranged thereon, a circular rotatable carrier provided with a slotted fulcrum-bearing rim, a series of arms mounted thereon, each arm having means for detachably holding an exhibit-plate and for presenting the same in alinement with the plate-receiving space of the projecting lantern, a reciprocating plunger having means for actuating an individual arm at a position coincident with said plate-receiving space, means for depressing and lifting said plunger, means for feeding forward said carrier to bring successive arms into position with the projecting-lantern, and mechanism intermittently brought into action for controlling the operation of said means.

11. In an automatic exhibition apparatus, the combination, with the projecting-lantern, plate-carrying mechanism, devices for movably supporting a series of exhibit-plates individually thereon, means for moving the carrier to bring said supporting devices successively to the projecting lantern, and means for shifting the supporting devices to move an individual exhibit-plate into and from the projecting-lantern; of suitable power transmission gearing, and a governing device that automatically limits the time of each exhibit and controls the actions of the plate-shifting mechanism, substantially as set forth.

12. In combination, with a projecting-lantern, means for supporting a series of individual plate holding elements, and means for advancing said series by intermittent steps to bring the plate-holding elements successively to a predetermined position; of an automatically stopping means for shifting an individual plate-holding element to transfer the plate held thereon from the series alinement to the focal axis of the projecting-lantern, retaining it there for a period and returning it to the series line; and an electrical controlling mechanism for limiting the time period of the respective actions, and means for imparting power and motion to the series-moving mechanism and plate-shifting mechanism.

13. In mechanism of the class described, the combination with a projecting-lantern, a rotatable carrier, a tubular bearing therefor, arms pivotally mounted upon said carrier, means for retaining exhibit-plates connected with said arms; a central plunger or shaft slidable through said bearing and having means for engaging said arms for swinging the exhibit-plates into the path of the projecting-lantern light, a ratchet or detent-wheel supporting the carrier, pawl devices engaging said detent-wheel for advancing the carrier, an actuating shaft and connections for moving the plunger and the pawl-devices, an operator-wheel and stop-clutch on said shaft, and means for tripping the clutch.

14. In a mechanism for the purpose described, the combination, with a projecting-lantern, a carrier, a series of arms supported on said carrier and provided with means for holding exhibit-plates, and means for actuating the individual arms at a predetermined position for shifting the exhibit-plates into and from alinement with the projecting lantern axis; of a light-stopping shutter, means for actuating said shutter for stopping the light during the shifting of the exhibit-plates, and means for moving said carrier step-by-step to bring the respective plate-holding arms to the predetermined position.

15. In a mechanism for the purpose described, a removable exhibit-carrier comprising a circular member or annulus having radial slots and bearing-seats thereon, a set of tiltable levers provided with plate-holding means at their outer ends, said levers supported within the slots and fulcrumed in the bearing-seats upon said annulus, springs for holding the levers respectively at their primal position, and means for releasably uniting said circular member with a carrier-support.

16. In a mechanism for the purpose specified, in combination, the projecting-lantern, a movable carrier, a series of plate-supporting devices mounted upon said carrier, means for detachably affixing exhibit-plates thereto, in plane approximately perpendicular to the axis of the projecting lantern, means for automatically moving the carrier to bring the plate-supporting devices successively to a predetermined position, means for moving the plate-supporting device when at said predetermined position, laterally to shift the carried exhibit-plate into line with the projecting-lantern, and an automatic controlling mechanism that limits or governs the frequency of the shifting actions.

17. In a mechanism for the purpose specified, a removable circular carrier, a series of vertically swinging levers fulcrumed on said carrier, means for attaching exhibit elements to the respective levers, springs for normally retaining the levers at primal position, a centered carrier support, a tubular bearing sleeve therefor, a plunger-rod movable through said bearing-sleeve and having means for actuating the individual swinging levers, guides for said plunger-rod, a rotating shaft and means for actuating said plunger-rod thereby, a wheel and stop-clutch for operating said shaft, a clutch-tripping device, and an automatic controlling means whereby the tripping of the clutch is effected and the mechanism intermittently thrown into action for reciprocating said plunger-rod.

18. In an automatic exhibition mechanism, in combination, with the operating-shaft, its clutch, clutch-tripping devices, and controlling magnet, and the shutter-actuating devices and controlling magnets therefor; of a timing-wheel provided with a contact detent for closing and breaking circuit with the clutch-trip-magnet, and a contact detent for closing and breaking circuit with the shutter-actuating magnet, the latter detent being arranged to close its circuit in advance of the former and to maintain it closed until after the clutch and operating-shaft have performed their action.

19. An apparatus for the purpose specified, comprising a projecting lantern, a series of tiltable arms each having means for holding an exhibit-plate, a carrier having said arms fulcrumed thereon, a ratchet-wheel connected with said carrier, a plunger-rod having means for individually actuating said arms at positions corresponding with the projecting-lantern, a crank-shaft and connection for reciprocating said plunger-rod, an automatic-stop clutch controlling said crank-shaft, clutch-tripping devices therefor, a ratchet actuating means operated in conjunction with the plunger, a light-stopping shutter, shutter-actuating means, an electro-magnet for controlling the shutter-actuating means, an electro-magnet for actuating the clutch-tripping devices, a timing device carrying contact detents for closing and breaking circuits through said magnets, a power motor and suitable transmission gearing for operating said crank-shaft and said timing device.

20. An automatic exhibition mechanism, including a plurality of independently movable carrier-members, each having means for securing an exhibit device thereon, a movable carrier having said carrier-members mounted upon it, means for controlling the individual movement of said carrier-members in respect to the carrier, for action at predetermined positions, means for actuating said carrier and carrier-members, means for transmitting power and motion thereto, an automatic stop-clutch controlling the transmission, and an intermittingly actuatable clutch-tripping means.

21. The combination with a magic lantern, of a rotating member carrying a plurality of slide-placing elements having slides secured thereon, means to rotate the member with a step by step movement, and means for individually projecting said slide-placing elements to move the slides in sequence into operative position.

22. The combination with a magic lantern, of a rotating member mounted adjacent the magic lantern, a plurality of slides each supported upon an individually movable slide-mounting device carried by the rotating member about its periphery, and means to move the slides consecutively into position for coöperation with the magic lantern.

23. The combination with a base, of a rotating table, mounted upon the base, a plurality of arms carried by the rotating table, a rotating shaft, means to transmit motion from the shaft to rotate the table, means to transmit motion from the shaft to consecutively move the arms.

24. In a machine of the class described, the combination of a horizontal circling shiftable flight carrier for the reception of radially connected flights, means for pivotally supporting the same, and means for swinging said flights successively into the same position to be exposed.

25. In a machine of the class described, the combination of a shiftable flight carrier for the reception of flights, means for supporting the same, means for shifting said carrier, and means for swinging said flights successively into position to be exposed.

26. In a machine of the class described, the combination of a flight carrier mounted to have circulatory intermittent action, means for supporting the same, flights pivotally mounted on said carrier for edgewise swinging movement, and means for actuating said flights successively into position to be exposed.

27. In a machine of the class described, the combination of a carrier, a series of flights jointed thereto, means for shifting the same in a predetermined path, and means for swinging said flights in a plane transverse to the plane of their shiftable movement and successively into position to be exposed.

28. In a machine of the class described, the combination of a series of individually tiltable flights, means for shifting the same in a body in a predetermined path, and means for swinging said flights in a plane transverse to the plane of their shiftable movement and successively into position to be exposed.

29. In a machine of the class described, the combination of a series of individually fulcrumed swinging flights, means for shifting the same in a predetermined path, and means for swinging said flights in a plane transverse to the plane of their shiftable movement and successively into position to be exposed.

30. In a machine of the class described, the combination of a series of radially supported edgewise oscillatable flights, means for shifting the same in a predetermined path, and means for swinging said flights in a plane transverse to the plane of their shiftable movement and successively into position to be exposed.

31. In a machine of the class described, the combination of a fulcrum supporting means, a series of flights fulcrumed thereon, means for shifting the same in a circular path, and means for swinging said flights out of said circular path in a plane transverse to the plane of their shiftable movement and successively into position to be exposed.

32. In a machine of the class described, the combination of a revoluble flight carrier, means for supporting the same, pivoted flights carried by said carrier, and intermittently actuating means for swinging said flights successively into a common predetermined position to be exposed.

33. In a machine of the class described, the combination of a flight carrier, means for uprightly supporting the same, flights pivotally carried by said carrier, means for shifting the carrier intermittently, and means for swinging said flights successively into position to be exposed, and means for returning said flights to their normal position.

Witness my hand this 7th day of May 1907.

ROBERT E. LIPPINCOTT.

Witnesses:
CHAS. H. BURLEIGH,
GEO. M. RICE.